3,341,505
ADHESIVE COMPOSITIONS COMPRISING AMINE
SALTS OF ACRYLIC POLYMERS
Robert J. Gander, Whitehouse, N.J., assignor to Johnson
& Johnson, a corporation of New Jersey
No Drawing. Filed Oct. 1, 1965, Ser. No. 492,334
20 Claims. (Cl. 260—86.1)

This application is a continuation-in-part of application Ser. No. 358,622, filed Apr. 9, 1964 which has now become abandoned.

The present invention is drawn to methacrylate film-forming compositions and more particularly to compositions which can be spread on the skin to form thin, flexible, water-removable protective film coatings.

It has heretofore been proposed to form protective coatings on the skin by coating the skin with a solution of a film-forming resin and then permit the solvent to evaporate to leave a protective film coating over the skin. Protective film coatings of this type are described, for example, in U.S. Patent No. 2,972,545. However, one of the disadvantages of the heretofore available protective film-forming compositions is the difficulty of removing the same, particularly of removing the film where good skin adherence is obtained. Flexible methacrylate films have heretofore been proposed as protective wound covers, the same being applied by treating the film with a solvent to make the film tacky and skin adherent, or by applying a pressure-sensitive adhesive to the film through which the film is adhered to the skin. Such a product is described in U.S. Patent No. 2,949,443. However, as both the film and the adhesive is water-insoluble, any residue left on the skin after stripping the film from the skin must either be rubbed off or removed with organic solvents.

It is an object of the present invention to prepare film-forming compositions which can be used to form thin protective films directly on a skin surface, which films can be removed from the skin surface when desired by washing with water. It is a further object of the present invention to prepare organic solutions of film-forming compositions which can be spread on the surface of underlying skin, and the organic solvent evaporated to leave a water-soluble protective film having good skin adherence. Other objects and advantages of this invention will become apparent from the following description wherein are set forth by way of illustration and example certain embodiments of this invention.

It has now been discovered that excellent skin-adherent film-forming compositions that are soluble in organic solvents and form films that are not only skin adherent but also water-soluble can be obtained through the polymerization of certain esters of acrylic and methacrylic acid with certain acrylate or methacrylate amine containing monomers. Some amine-containing monomers of this general type, including their preparation, are described, for example, in U.S. Patent 2,744,884. The acrylate or methacrylate amine containing monomers found useful in practicing the present invention can be described by the general formula:

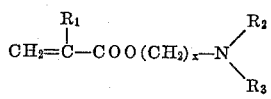

in which $R_1$ is H or $CH_3$,
$x$ is an integer of 2 to 12,
$R_2$ is H or an alkyl group of $C_1$ to $C_{12}$, and
$R_3$ is an alkyl group of $C_1$ to $C_{12}$.

The amine-containing monomers may be polymerized with esters of methacrylic or acrylic acid alone or simultaneously with esters of these acids and other acrylic monomers. The amine-containing monomer should not exceed 60% by weight of the monomer composition from which the film-forming polymer is prepared.

The methacrylate esters found suitable are the esters of alkyl alcohols containing 1 to 12 carbon atoms and the acrylate esters found suitable are esters of alkyl alcohols containing 1 to 3 carbon atoms. These esters can be represented by the general formula:

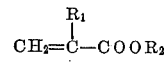

in which $R_1$ is H or $CH_3$ and in which $R_2$ is an alkyl chain of $C_1$ to $C_{12}$ carbon content, where $R_1$ is $CH_3$ and $C_1$ to $C_3$ carbon content, where $R_1$ is H.

Some examples of esters of methacrylic acid which may be used in practicing the present invention are the esters of methacrylic acid with alkyl alcohols such as methyl, ethyl, isopropyl and n-propyl alcohol, n-butanol, isobutanol, n-pentanol, isopentanol, 2-methylpentanol, 1-methylbutanol, 1-methylpentanol, 2-methylpentanol, 3-methylpentanol, 2-ethylbutanol, pentanol-3, 3,5,5-trimethylhexanol, heptanol-3, isooctanol, n-decanol, n-dodecanol, n-heptanol, 2-ethylhexanol, n-hexanol, n-octanol, diisobutyl carbinol, 2,6,8-trimethyl-4-nonanol. Also some examples of esters of acrylic acid that may be used are the esters of acrylic acid with alkyl alcohols such as methyl, ethyl, isopropyl and n-propyl alcohol.

Other acrylic monomers may be added to modify the properties if desired. Thus, for example, some of the preferred film-forming compositions with respect to long-term skin adherence are obtained by including on a solids basis from 10 to 30% by weight N-tert.-butylacrylamide in the monomer mix in preparing the film-forming polymer composition.

Although the present invention is primarily directed to film-forming compositions that form a thin, flexible, skin-adherent water-soluble film when applied as an organic solution, on evaporation of the organic solvent the same can be used as cement compositions for adhering dressings and the like to an underlying skin surface the dressing being applied before solvent evaporation and while the polymer film is still tacky. The organic solvent used in forming the polymer solutions should preferably have a boiling point below about 75° C. so that it will readily evaporate from the skin surface to leave a protective water-soluble film. Organic solvents which are generally suitable are acetone, ethyl acetate and methyl ethyl ketone.

Alpihatic hydrocarbons are generally unsatisfactory, as the film-forming polymer compositions of the present invention are not readily soluble therein.

The acid ion X of the solubilizing group may be any acid ion capable of being attached either directly or indirectly to form the amine salt. The preferred acid ions are fluoride chloride, bromide, iodide, sulfate and organic sulfonates. However, the invention is not limited to these and includes other acid anions such as nitrates, phosphates, and carboxylic anions, such as acetates, propionates and benzoates.

Insofar as I am aware, any salt forming acid anion may be used. Where the film-forming composition is to be applied to the human skin, an acid anion would be selected that is not skin irritating. However, insofar as I am aware, none of the acid anions, particularly those mentioned, are skin irritating in the polymer salt form.

The solubilizing amine salts are incorporated into the polymer as previously indicated by using, as one of the reactive monomers, an acrylic monomer derived from either methacrylic acid or acrylic acid and containing at least one amine group. The monomer used may be an amine salt. However, in the preferred practice of the inention, the amine salts are not formed until after polymerization has been completed after which the acrylate olymer containing the amine groups is converted to the mine salt by neutralization with an acid, the ion of which s to be added.

Although any monomer containing amine groups having the general chemical structure previously set forth ay be used in practicing the present invention, in specific xamples given to describe the practice of the present invention the two preferred amine acrylate monomers, diethylaminoethyl methacrylate and tert.-butylaminoethyl ethacrylate, are used. The invention, however, is not mited to the use of these particular amine acrylate monoers and others, as previously indicated, may be employed.

It is apparently the presence of the amine salt in the mine acrylate copolymer film-forming composition that auses the solubilizing of the polymer film to the point here it can be removed from the skin or other surface by ashing. Polymer films containing amine groups without onversion to the salt form are found to be just as insolble in water as films which do not contain the amine roups. However, after the salts are formed by incorporatig the acid ion into the amine group, the polymer films re solubilized to the extent that they can be readily reoved from the skin by washing with water. This solubilizig effect, however, apparently only occurs when the olubizing group

orming the salt is present in an amount of at least 1.7% y weight of the total polymer. Thus, for example, where e amine acrylate is dimethylaminoethyl methacrylate ydrochloride or tert.-butylaminoethyl methacrylate hyrochloride, the same should be present in amounts of bout at least 25% in order to obtain the solubilizing effect hich makes the polymer films water-removable. (25% imethylaminoethyl methacrylate hydrochloride is equivant to 1.9% of

roup and 25% tert.-butylaminoethyl methacrylate hyrochloride is equivalent to 1.7% of

roup). This effect on solubility is well illustrated by the ollowing table:

Although the lower limit with respect to the weight percent of the salt forming group

is important with respect to getting methacrylate films which are water-removable, surprisingly there appears to be no critical upper limit with respect to the weight percent of the salt forming group

present with respect to its interfering with the skin adherence of the polymer film former. Amounts of the water-solubilizing group

substantially in excess of the initial amount needed to solubilize the methacrylate polymer do not appear to appreciably deleteriously affect the skin adhesion even over extended periods of wear.

The following examples, given for the purpose of illustration only, will help to further illustrate the practice of the present invention.

*Example I*

A 1-liter, 3-neck flask is provided with a reflux condenser, a mechanical stirrer, a nitrogen inlet tube, and a thermometer. The flask is charged with 75 grams of lauryl methacrylate, 75 grams of tert.-butylaminoethyl methacrylate, and 150 grams of ethyl acetate. During a 15-minute period the reaction mixture is heated to 75–80° C. and stirred while a slow stream of nitrogen is swept through the apparatus. Nitrogen flow is then discontinued and 0.76 gram of 2,2′-azobisisobutyronitrile is added. After a short induction period, polymerization begins and the reaction mixture thickens. Stirring and heating at 80–85° C. are continued for two hours at which time 0.38 gram more 2,2′-azobisisobutyronitrile is added. The reaction is continued for two hours longer and then cooled to room temperature. The solids content of a sample heated for 5 hours at 105° C. is 48.4%.

The ethyl acetate is dried from the polymer by casting the solution in a thin film on silicone-coated paper, then drying at 160° F. The polymer is very tacky and has a relative viscosity of 1.24 (1.000 g./100 ml., toluene, 30° C.). The neutral equivalent of the polymer is 377, measured by titrating samples potentiometrically with 0.1 N

AMINE-CONTAINING METHACRYLATE POLYMERS

| Polymer Composition, wt. percent [1] | | | | | | Rel. Vis. of Free Base [2] | Neut. Equiv. of Free Base [3] | Water Solubility of Salt [4] | |
|---|---|---|---|---|---|---|---|---|---|
| EA | BACA | BMA | LMA | DMAEMA | TBAEMA | | | Hydrochloride | Hydrosulfate |
| 70 | | | | | 30 | 1.50 | 545 | Soluble | |
| | 28 | 42 | | | 30 | 1.50 | 580 | do | |
| | | 40 | 40 | | 20 | 1.33 | 943 | Insoluble | |
| | | 37.5 | 37.5 | | 25 | 1.32 | 773 | Soluble | |
| | | 36.3 | 36.3 | | 27.4 | 1.33 | 708 | do | |
| | | 35 | 35 | | 30 | 1.34 | 636 | do | Soluble. |
| | | 33.7 | 33.7 | | 32.6 | 1.33 | 593 | do | Do. |
| | | 40 | 40 | 20 | | 1.24 | 797 | Insoluble | |
| | | 18.7 | 56.3 | 25 | | 1.24 | 654 | Soluble | |
| | | 37.5 | 37.5 | 25 | | 1.24 | 630 | do | Do. |
| | | 56.3 | 18.7 | 25 | | 1.25 | 639 | do | Do. |
| | | 35 | 35 | 30 | | 1.32 | 557 | do | Do. |
| | | | 70 | | 30 | 1.31 | 665 | Insoluble | |
| | | | 65 | | 35 | 1.30 | 604 | do | |
| | | | 57.5 | | 42.5 | 1.22 | 438 | do | |
| | | | 50 | | 50 | 1.24 | 377 | do | |
| | | | 75 | 25 | | 1.22 | 646 | Insoluble | |
| | | | 70 | 30 | | 1.24 | 568 | Soluble | |
| | | | 65 | 35 | | 1.24 | 464 | do | |
| | | | 50 | 50 | | 1.23 | 316 | do | |

[1] EA, ethyl acrylate; BACA, N-tert.-butylacrylamide; BMA, n-butyl methacrylate; LMA, lauryl methacrylate; DMAEMA, dimethylaminoethyl methacrylate; TBAEMA, tert.-butylaminoethyl methacrylate.
[2] At a concentration of 1.000 g./100 ml. in toluene at 30° C.
[3] By potentiometric titration in 50-50 benzene-ethanol using 0.1 N ethanolic hydrochloric acid.
[4] At a concentration of 0.2 percent in water.

ethanolic hydrochloric acid in a solution of 50% benzene and 50% ethanol.

The hydrochloride salt of the polymer is prepared by neutralizing 100 grams of the reaction mixture with 67.8 ml. of 1.89 N ethanolic hydrochloric acid. It is a resin which is rapidly soluble in water.

A solution of 10 weight percent of the hydrochloride salt is prepared in a solvent containing 70 parts of ethyl acetate and 30 parts of ethanol. This solution is painted on human skin and allowed to dry, forming protective coverings 0.2 to 0.5 mil in thickness. The films are glossy and completely free of tackiness. They adhere well and cause no irritation to the underlying skin. They are easily washed from the skin with plain water.

*Example II*

The polymerization procedure of Example I is repeated using a monomer charge of 50.5 grams of n-butyl methacrylate, 50.5 grams of lauryl methacrylate and 49 grams of tert.-butyl-aminoethyl methacrylate. Only 0.38 gram of 2,2'-azobisisobutyronitrile is used to initiate the polymerization, and none is added during the course of the reaction. After a four-hour reaction period, the reaction mixture has a solids content of 43.0 percent. The polymer has a relative viscosity of 1.33 and a neutral equivalent of 593.

The hydrochloride salt of the polymer is made by neutralizing 100 grams of the reaction mixture with 38.4 grams of 1.89 N ethanolic hydrochloric acid. In water the salt disintegrates in a few minutes to a loose gel, which dissolves after several hours.

Solutions of the hydrochloride salt painted on human skin, as in Example I, form nonirritating, slightly tacky films which adhere well. The films are removed from skin by washing with water, but they require longer exposure to water and more rubbing than the polymer salt of Example I. The films are removed more rapidly with warm than with cold water.

The methacrylate polymers of the present invention have the interesting property that they are both soluble in organic solvents as well as being sufficiently soluble in water to permit the removal of the same by water washing. The solubility in organic solvents permits the ready handling of the polymers for spreading into thin skin-adhering films onto the skin of a patient. This may be done by either spraying or painting the polymer on the area to be covered. After the polymer film has served its purpose and it is desired to remove the same, it can then be removed by washing with water without the need of special solvents.

Particular embodiments of the invention have been used to illustrate the same. The invention, however, is not limited to these specific embodiments. In view of the foregoing disclosure, variations or modifications thereof will be apparent, and it is intended to include within the invention all such variations and modifications except as do not come within the scope of the appended claims.

Having thus described my invention, I claim:

1. A liquid composition for forming flexible water-soluble polymer films comprising an organic solvent having dissolved therein a water-soluble film-forming linear polymer amine salt containing in interpolymerized form an acrylic ester of the group acrylate esters and methacrylate esters of the general structure:

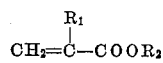

wherein $R_1$ is H or $CH_3$ and
$R_2$ is an alkyl chain of 1 to 12 carbons where $R_1$ is $CH_3$ and $R_2$ is an alkyl chain of 1 to 3 carbons where $R_1$ is H
and an acrylic amine of the general structure:

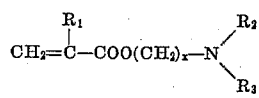

wherein
$R_1$ is H or $CH_3$
$x$ is an integer of 2 to 12
$R_2$ is H or an alkyl group of 1 to 12 carbons
$R_3$ is an alkyl group of 1 to 12 carbons, the amine derived component of said polymer containing 1.7% to 4.6% by weight of radical

said radical being present in the salt form

where X is an anion of an acid and said ester derived component of said polymer being present in an amount of at least 40% by weight of said linear polymer amine salt on a nonsalt basis.

2. A film-forming composition of claim 1 in which the solvent of said organic solution has a boiling point below about 75° C.

3. A protective film-forming composition of claim 2 in which X is an anion of the group consisting of halides, sulfate and organic sulfonates.

4. A protective film-forming composition of claim 3 in which the anion of said group is a halide.

5. A protective film-forming composition of claim 4 in which the anion X is chloride.

6. A protective film-forming composition of claim 3 in which the anion X is sulfate.

7. A protective film-forming composition of claim 3 in which the anion X is an organic sulfonate.

8. A protective film-forming composition of claim 7 in which the anion X is p-toluene sulfonate.

9. A film-forming polymer composition soluble in water and soluble in organic solvents comprising a linear polymer amine salt containing in interpolymerized form an acrylic ester of the group acrylate esters and methacrylate esters of the general structure:

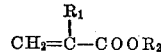

wherein $R_1$ is H or $CH_3$ and
$R_2$ is an alkyl chain of 1 to 12 carbons where $R_1$ is $CH_3$ and $R_2$ is an alkyl chain of 1 to 3 carbons where $R_1$ is H,
and an acrylic amine of the group consisting of dimethylaminoethyl methacrylic and tert.-butylaminoethyl methacrylic, the amine derived component of said polymer containing 1.7% to 4.6% by weight of radical

said radical being present in the salt form

where X is an anion of an acid and said ester derived component of said polymer being present in an amount of at least 40% by weight of said linear polymer amine salt on a nonsalt basis.

10. A film-forming polymer composition of claim 9 in which the monomer of said group is dimethylaminoethyl methacrylate.

11. A film-forming polymer composition of claim 10 in which said dimethylaminoethyl methacrylate is copolymerized with at least one monomer of the group consisting of n-butyl methacrylate and lauryl methacrylate.

12. A film-forming polymer composition of claim 11 in which X is an anion of the group consisting of halides, sulfates and organic sulfonates.

13. A film-forming polymer composition of claim 12 in which the anion X is a halide.

14. A film-forming polymer composition of claim 13 in which the anion X is chloride.

15. A film-forming polymer composition of claim 12 in which the anion X is a sulfate.

16. A film-forming polymer composition of claim 9 in which the monomer of said group is tert.-butylaminoethyl methacrylate.

17. A film-forming polymer composition of claim 16 in which said tert.-butylaminoethyl methacrylate is copolymerized with at least one monomer of the group consisting of n-butyl methacrylate and lauryl methacrylate.

18. A film-forming polymer composition of claim 17 in which X is an anion of the group consisting of halides, sulfates and organic sulfonates.

19. A film-forming polymer composition of claim 18 in which the anion X is a halide.

20. A film-forming polymer composition of claim 18 in which the anion X is sulfate.

References Cited

UNITED STATES PATENTS

| | | | |
|---|---|---|---|
| 2,744,844 | 5/1956 | Benneville | 260—86.1 |
| 2,884,126 | 4/1959 | Ulrich | 260—86.1 |
| 2,892,822 | 6/1959 | Gray et al. | 260—86.1 |
| 2,949,443 | 8/1960 | Merriam et al. | 260—86.1 |
| 3,099,636 | 7/1963 | Skiles | 260—89.5 |

FOREIGN PATENTS 847,815  9/1960  Great Britain.

JOSEPH L. SCHOFER, *Primary Examiner.*

H. WONG, *Assistant Examiner.*

UNITED STATES PATENT OFFICE
CERTIFICATE OF CORRECTION

Patent No. 3,341,505                                September 12, 1967

Robert J. Gander

It is hereby certified that error appears in the above numbered patent requiring correction and that the said Letters Patent should read as corrected below.

Column 2, line 20, for "2-methylpentanol" read -- 2-methylbutonol --; columns 3 and 4, in the table, under the subheading "Hydrochloride", lines 14, 15 and 16 thereof, for "Insoluble", each occurrence, read -- Soluble --.

Signed and sealed this 1st day of October 1968.

(SEAL)

Attest:

Edward M. Fletcher, Jr.                                    EDWARD J. BRENNER

Attesting Officer                                               Commissioner of Patents